United States Patent
Dunn et al.

(10) Patent No.: US 7,549,125 B2
(45) Date of Patent: Jun. 16, 2009

(54) INFORMATION PICKER

(75) Inventors: Melissa W. Dunn, Woodinville, WA (US); Jonathan D. Perlow, Seattle, WA (US); Vivien Park, Seattle, WA (US); Kim Cameron, Bellevue, WA (US); John-Anthony Owens, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/692,257

(22) Filed: Oct. 23, 2003

(65) Prior Publication Data

US 2005/0091072 A1    Apr. 28, 2005

(51) Int. Cl.
 *G06F 3/00* (2006.01)
(52) U.S. Cl. ...................................... 715/739
(58) Field of Classification Search ................. 715/739
 See application file for complete search history.

(56) References Cited

U.S. PATENT DOCUMENTS

| | | | |
|---|---|---|---|
| 5,214,756 A | 5/1993 | Franklin |
| 5,640,565 A | 6/1997 | Dickinson |
| 5,659,788 A | 8/1997 | Sorneya |
| 5,737,726 A | 4/1998 | Cameron |
| 5,767,897 A | 6/1998 | Howell |
| 5,870,744 A | 2/1999 | Sprague |
| 5,873,108 A | 2/1999 | Goyal |
| 5,896,321 A | 4/1999 | Miller |
| 5,913,032 A | 6/1999 | Schwartz |
| 5,923,848 A | 7/1999 | Goodhand |
| 5,950,193 A | 9/1999 | Kulkarni |
| 5,959,629 A | 9/1999 | Masui |
| 5,999,208 A | 12/1999 | McNerney |
| 6,008,799 A | 12/1999 | Van Kleeck |
| 6,014,135 A | 1/2000 | Fernandes |
| 6,026,396 A | 2/2000 | Hall |
| 6,065,012 A | 5/2000 | Balsara |
| 6,208,339 B1 | 3/2001 | Atlas |
| 6,209,005 B1 | 3/2001 | Harker |
| 6,212,534 B1 | 4/2001 | Lo |
| 6,216,122 B1 | 4/2001 | Elson |

(Continued)

FOREIGN PATENT DOCUMENTS

WO    WO02/073454 A2    9/2002

(Continued)

OTHER PUBLICATIONS

U.S. Appl. No. 12/195,214, filed Aug. 20, 2008, Pettinati.

(Continued)

*Primary Examiner*—Doug Hutton
*Assistant Examiner*—Henry Orr
(74) *Attorney, Agent, or Firm*—Workman Nydegger (57) ABSTRACT

A user is able to informatively control how contact information is provided to one or more applications through the use of a persona interface object, corresponding personas and contact information, and an information picker interface. The persona interface identifies available personas, each persona having different contact information. The user can select a persona to use in response to an applications request for information. The personas can be modified and developed through the information picker interface, which can also be used to inform the user about what information is being requested and how it will be used.

22 Claims, 5 Drawing Sheets

U.S. PATENT DOCUMENTS

| | | | |
|---|---|---|---|
| 6,247,043 | B1 | 6/2001 | Bates |
| 6,269,369 | B1 | 7/2001 | Robertson |
| 6,339,826 | B2 | 1/2002 | Hayes |
| 6,411,961 | B1 | 6/2002 | Chen |
| 6,434,564 | B2 | 8/2002 | Ebert |
| 6,460,074 | B1 | 10/2002 | Fishkin |
| 6,539,379 | B1 | 3/2003 | Vora |
| 6,557,004 | B1 | 4/2003 | Ben-Shachar et al. |
| 6,564,213 | B1 | 5/2003 | Ortega |
| 6,564,327 | B1 * | 5/2003 | Klensin et al. ............... 726/7 |
| 6,571,235 | B1 | 5/2003 | Marpe |
| 6,581,059 | B1 * | 6/2003 | Barrett et al. ............... 707/9 |
| 6,581,062 | B1 | 6/2003 | Draper |
| 6,609,108 | B1 | 8/2003 | Pulliam |
| 6,643,661 | B2 | 11/2003 | Polizzi |
| 6,661,434 | B1 | 12/2003 | MacPhail |
| 6,668,281 | B1 | 12/2003 | Ayyadurai |
| 6,678,685 | B2 | 1/2004 | McGill |
| 6,699,125 | B2 | 3/2004 | Kirmse |
| 6,701,348 | B2 | 3/2004 | Sommerer |
| 6,718,366 | B2 | 4/2004 | Beck |
| 6,753,889 | B1 | 6/2004 | Najmi |
| 6,781,608 | B1 | 8/2004 | Crawford |
| 6,791,583 | B2 | 9/2004 | Tang |
| 6,820,075 | B2 | 11/2004 | Shanahan |
| 6,820,204 | B1 * | 11/2004 | Desai et al. ............... 726/6 |
| 6,828,988 | B2 | 12/2004 | Hudson |
| 6,829,607 | B1 | 12/2004 | Tafoya |
| 6,832,263 | B2 | 12/2004 | Polizzi |
| 6,845,370 | B2 * | 1/2005 | Burkey et al. ............... 707/3 |
| 6,870,921 | B1 * | 3/2005 | Elsey et al. ............ 379/218.01 |
| 6,871,140 | B1 * | 3/2005 | Florance et al. ............. 701/207 |
| 6,883,000 | B1 | 4/2005 | Gropper |
| 6,895,388 | B1 | 5/2005 | Smith |
| 6,907,580 | B2 | 6/2005 | Michelman |
| 6,947,929 | B2 | 9/2005 | Bruce |
| 6,959,340 | B1 | 10/2005 | Najmi |
| 6,983,310 | B2 | 1/2006 | Rouse |
| 6,985,924 | B2 | 1/2006 | Schwartz |
| 6,988,128 | B1 | 1/2006 | Alexander |
| 6,990,495 | B1 | 1/2006 | Grason |
| 6,993,712 | B2 | 1/2006 | Ramachandran |
| 7,007,149 | B2 | 2/2006 | Chung |
| 7,010,572 | B1 | 3/2006 | Benjamin |
| 7,010,599 | B2 | 3/2006 | Shrinivasan |
| 7,010,616 | B2 | 3/2006 | Carlson |
| 7,043,471 | B2 | 5/2006 | Cheung |
| 7,068,768 | B2 | 6/2006 | Barnes |
| 7,076,498 | B2 | 7/2006 | Banerjee |
| 7,096,232 | B2 | 8/2006 | Doss |
| 7,113,941 | B2 | 9/2006 | Arend |
| 7,117,271 | B2 | 10/2006 | Haverstock |
| 7,130,853 | B2 | 10/2006 | Roller |
| 7,139,774 | B2 | 11/2006 | Dettinger |
| 7,143,190 | B2 | 11/2006 | Christensen |
| 7,146,570 | B2 | 12/2006 | Yeh |
| 7,149,731 | B2 | 12/2006 | Dettinger |
| 7,159,207 | B2 | 1/2007 | Tang |
| 7,162,474 | B1 | 1/2007 | Harker |
| 7,185,290 | B2 | 2/2007 | Cadiz |
| 7,191,210 | B2 | 3/2007 | Grossman |
| 7,209,951 | B2 | 4/2007 | Goldberg |
| 7,185,271 | B2 | 7/2007 | Lee |
| 7,302,634 | B2 | 11/2007 | Lucovsky |
| 2002/0029254 | A1 * | 3/2002 | Davis et al. ............... 709/217 |
| 2002/0073207 | A1 | 6/2002 | Widger |
| 2002/0107914 | A1 | 8/2002 | Charisius |
| 2002/0120864 | A1 * | 8/2002 | Wu et al. ............... 713/201 |
| 2002/0143961 | A1 * | 10/2002 | Siegel et al. ............... 709/229 |
| 2002/0156895 | A1 * | 10/2002 | Brown ............... 709/226 |
| 2002/0186257 | A1 | 12/2002 | Cadiz |
| 2003/0041065 | A1 | 2/2003 | Lucovsky |
| 2003/0041076 | A1 | 2/2003 | Lucovsky |
| 2003/0069874 | A1 * | 4/2003 | Hertzog et al. ............... 707/1 |
| 2003/0050911 | A1 | 5/2003 | Lucovsky |
| 2003/0158855 | A1 | 8/2003 | Farnham |
| 2003/0210265 | A1 | 11/2003 | Haimberg |
| 2004/0083453 | A1 | 4/2004 | Knight |
| 2004/0093334 | A1 * | 5/2004 | Scherer ............... 707/8 |
| 2004/0103364 | A1 | 5/2004 | Dornback |
| 2004/0107283 | A1 | 6/2004 | Paddon |
| 2004/0117322 | A1 * | 6/2004 | Bjorksten et al. ............. 705/80 |
| 2004/0139025 | A1 * | 7/2004 | Coleman ............... 705/51 |
| 2004/0177082 | A1 | 9/2004 | Nitta |
| 2004/0199581 | A1 * | 10/2004 | Kucharewski et al. ....... 709/204 |
| 2004/0210844 | A1 | 10/2004 | Pettinati |
| 2004/0235520 | A1 | 11/2004 | Cadiz |
| 2004/0236792 | A1 * | 11/2004 | Celik ............... 707/104.1 |
| 2004/0243935 | A1 | 12/2004 | Abramovitch |
| 2004/0260948 | A1 * | 12/2004 | Miyata et al. ............... 713/201 |
| 2005/0002510 | A1 * | 1/2005 | Elsey et al. ............ 379/201.01 |
| 2005/0004874 | A1 * | 1/2005 | Gilmour et al. ............... 705/51 |
| 2005/0015439 | A1 | 1/2005 | Balaji |
| 2005/0080805 | A1 | 4/2005 | Haeberle |
| 2005/0114329 | A1 | 5/2005 | Dettinger |
| 2005/0131888 | A1 | 6/2005 | Tafoya |
| 2005/0182741 | A1 | 8/2005 | Grossman |
| 2005/0262208 | A1 | 11/2005 | Haviv |
| 2005/0283468 | A1 | 12/2005 | Karnvar |
| 2006/0010104 | A1 | 1/2006 | Pettinati |
| 2006/0041545 | A1 | 2/2006 | Heidloff |
| 2006/0053384 | A1 | 3/2006 | La Fetra |
| 2006/0064645 | A1 | 3/2006 | Neven |
| 2006/0174002 | A1 | 8/2006 | Shrinivasan |
| 2006/0253787 | A1 | 11/2006 | Fogg |
| 2006/0277213 | A1 | 12/2006 | Robertson |

FOREIGN PATENT DOCUMENTS

WO     WO 2005013079 A2 *   2/2005

OTHER PUBLICATIONS

By Gordon Padwick, Helen Feddma; ProQuest Information and Learning—"Special Edition Using Microsoft Outlook 2000"; Publisher; Que; Pub Date: May 12, 1999; "Safari Tech Books, Online".

Zhan, H. F., et al., "A Web-Based Collaborative Product Design Platform for Dispersed Network Manufacturing", Journal of Materials Processing, vol. 138, Issues 1-3, Jul. 20, 2003, pp. 600-604.

Huynh, David, et al., "Haystack: A Platform for Creating, Organizing and Visualization Information Using RDF", Semantic Web Workshop (atWWW2002), Honolulu, HI, May 2002, pp. 1-11.

Getting Results with Microsoft Office 97, Microsoft Corp., Redmond, WA, © 1997, pp. 28-31, 345-374 and 470-471.

Padwick, Gordon et al., Special Edition Using Microsoft Outlook 2000, Que Corp., Indianapolis, IN, May 1999, pp. 370-376, 382-386 and 392-396.

Morrison, Michael et al., XML Unleashed, SAMS Corp., Indianapolis, IN, Dec. 1999, pp. 26-37, 84-104 and 106-122.

Office Action dated Jun. 6, 2006 cited in U.S. Appl. No. 10/324,746.

Office Action dated Feb. 26, 2007 cited in U.S. Appl. No. 10/324,746.

Notice of Allowance dated Sep. 7, 2007 cited in U.S. Appl. No. 10/327,746.

Office Action dated Apr. 6, 2007 cited in U.S. Appl. No. 10/845,464.

Office Action dated Jan. 28, 2008 cited in related U.S. Appl. No. 10/845,464.

Notice of Allowance dated May 19, 2008 cited in U.S. Appl. No. 10/845,464.

Notice of Allowance dated Jun. 13, 2008 cited in U.S. Appl. No. 10/885,974.

Office Action dated Apr. 5, 2006 cited in U.S. Appl. No. 10/324,250.

Office Action dated Sep. 22, 2006 cited in U.S. Appl. No. 10/324,250.

Office Action dated Feb. 7, 2007 cited in U.S. Appl. No. 10/324,250.

Notice of Allowance dated Nov. 16, 2007 cited in U.S. Appl. No. 10/324,250.

Office Action dated Apr. 14, 2006 cited in U.S. Appl. No. 10/324,251.
Office Action dated Nov. 3, 2006 cited in U.S. Appl. No. 10/324,251.
Office Action dated Jan. 22, 2007 cited in U.S. Appl. No. 10/324,243.
Office Action dated Mar. 24, 2008 cited in U.S. Appl. No. 10/324,243.
Office Action dated Apr. 3, 2006 cited in U.S. Appl. No. 10/324,246.
Office Action dated Oct. 31, 2006 cited in U.S. Appl. No. 10/324,246.
Office Action dated Mar. 21, 2007 cited in U.S. Appl. No. 10/324,246.
Notice of Allowance dated Oct. 4, 2007 cited in U.S. Appl. No. 10/324,246.
Notice of Allowance dated Dec. 13, 2007 cited in U.S. Appl. No. 10/324,246.
Office Action dated Apr. 17, 2006 cited in U.S. Appl. No. 10/326,660.
Office Action dated Oct. 16, 2006 cited in U.S. Appl. No. 10/326,660.
Office Action dated Feb. 8, 2007 cited in U.S. Appl. No. 10/326,660.
Notice of Allowance dated Nov. 16, 2007 cited in U.S. Appl. No. 10/326,660.
Office Action dated Sep. 13, 2006 cited in U.S. Appl. No. 10/780,496.
Office Action dated Mar. 16, 2007 cited in U.S. Appl. No. 10/780,496.
Office Action dated Feb. 7, 2008 cited in U.S. Appl. No. 10/780,496.
U.S. Appl. No. 10/324,243, filed Dec. 19, 2002, Thompson et al.
U.S. Appl. No. 10/324,246, filed Dec. 19, 2002, Grossman et al.
U.S. Appl. No. 10/324,250, filed Dec. 19, 2002, Grossman et al.
U.S. Appl. No. 10/324,251, filed Dec. 19, 2002, Grossman et al.
U.S. Appl. No. 10/324,746, filed Dec. 19, 2002, Grossman et al.
U.S. Appl. No. 10/326,660, filed Dec. 19, 2002, Grossman et al.
Kim, Sung Wan, et al., "Developing a Native Storage Structure for XML Repository System in Main Memory", 5th International Conference on High Speed Networks and Multimedia Communications, © 2002, pp. 96-100.
Shui, William M., et al., "Application of XML Schema and Active Rules System in Management and Integration of Heterogeneous Biological Data", BIBE '03, Mar. 10-12, 2003, pp. 367-374.
Banerjee, Sandeepan, et al., "Oracle8i—The XML Enabled Data Management System", 16th International Conference on Data Engineering, San Diego, CA Feb. 29-Mar. 3, 2000, pp. 561-568.
Haas, L.M., et al. "Transforming Heterogeneous Data with Database Middleware: Beyond Integration", Bulletin of the IEEE Computer Society Technical Committee on Data Engineering, © 1997, pp. 1-6.
Nambiar, Uilas, et al., "Current Approaches to XML Management", IEEE Internet Computing, vol. 6, Issue4, Jul./Aug. 2002, pp. 43-51.
Lear, Ann C., et al., "XML Seen as Integral to Application Integration", IT Professional, vol. 1, Issue 5, Sep./Oct. 1999, pp. 12-16.
Paul McFedries, Complete Idiot's Guide to Windows XP, Pub Date: Oct. 3, 2001. pp. 1-3.
Paul Thurrott's SuperSite for Windows: Internet Explorer 5.0 Reviewed. Duke Communications International, Inc. 2000. pp. 1-8.
Office Action dated Aug. 17, 2007 cited in related U.S. Appl. No. 10/780,496.
Office Action dated Aug. 23, 2007 cited in related U.S. Appl. No. 10/845,464.
Office Action dated Oct. 5, 2007 cited in related U.S. Appl. No. 10/885,974.
Notice of Allowance dated Oct. 2, 2007 cited in related U.S. Appl. No. 10/324,250.
Notice of Allowance dated Oct. 5, 2007 cited in related U.S. Appl. No. 10/326,660.
U.S. Appl. No. 11/760,392, filed Jun. 8, 2007, Grossman.
Microsoft Computer Dictionary, 2002, Microsoft Press, 5th edition, p. 162.
Padwick, Feddema, Special Edition Using Microsoft Outlook 2000, Que, Ch. 9 'Managing Contacts', p. 1-17.
Padwick, Feddema, Special Edition Using Microsoft Outlook 2000, Que, Ch. 16 'Managing Your Computer Environment': Using Other Shortcuts in the Outlook Bar, p. 1-4.
Padwick, Feddema, Special Edition Using Microsoft Outlook 2000, Que, Ch. 18 'Finding and Organizing Outlook Items': Using the QuickFind Contact Tool, p. 1-4.
Padwick, Feddema, Special Edition Using Microsoft Outlook 2000, Que, Ch. 18 'Finding and Organizing Outlook Items': Organizing Outlook Items, p. 1-7.
Padwick, Feddema, Special Edition Using Microsoft Outlook 2000, Que, Ch. 22, 'Creating and Using Rules', p. 1-5.
Padwick, Feddema, Special Edition Using Microsoft Outlook 2000, Que, Ch. 38 'Creating Views and Print Styles', p. 1-25.
Padwick, Feddema, Special Edition Using Microsoft Outlook 2000, Que, Ch. 41 'Creating and Using Custom Fields': Why Do You Need Custom Fields?, p. 1-14.
Padwick, Feddema, Special Edition Using Microsoft Outlook 2000, Que, Ch. 41 'Creating and Using Custom Fields': Creating a Simple Custom Field, p. 1-3.
Padwick, Feddema, Special Edition Using Microsoft Outlook 2000, Que, Appendix C 'Outlook's Files, Folders, Fields, and Registry Keys', p. 1.
Mohamed; "Marketcircle a recipient of the 2002 Apple Design Awards"; May 15, 2002; Marketcircle.
Hibbert, Chris, "Visual Flex and XML", downloaded from www.dataaccess.com/whitepapers/xml/XMLWP.htm, dated by Wayback Machine as: May 2, 2001, pp. 1-25.
Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.
Ren, Ligang, et al., "Data Synchronization in the Mobile Internet", The 7th Intl Conf on CSCW in Design, Sep. 25-27, 2002, pp. 95-98.
Lee, Jinho, et al., "An Evaluation of the Incorporation of a Semantic Network Into a Multidimensional Retrieval Engine", CIKM '03 New Orleans, LA, Nov. 3-8, 2003, pp. 572-575.
Su, Hong, et al., "Automating the Transformation of XML Documents", WIDM 2001, Atlanta, GA, Nov. 2001, pp. 68-75.
McCabe, M. Catherine, et al., "On the Design and Evaluation of a Multi-Dimensional Approach to Information Retrieval", SIGIR 2000, Athens, Greece, Jul. 2000, pp. 363-365.
Bussler, Chrisoph, et al., "A Conceptual Architecure for Semantic Web Enabled Services", SIGMOD Record, vol. 31, No. 4, Dec. 2002, pp. 24-29.
Nejdl, Wolfgang, et al., "EDUTELLA: A P2P Networking Infrastructure Based on RDF", WWW 2002, Honolulu, HI, May 7-11, 2002, pp. 604-615.
Bychkov, Yury, et al., "Interactive Migration of Legacy Databases to Net-Centric Technologies", Proceedings of the 8th Working Conference on Reverse Engineering, Oct. 2-5, 2001, pp. 328-334.
Bakker, John-Luc, et al., "Next Generation Service Creation Using XML Scripting Languages", IEEE International Conference on Communications, vol. 4, Apr. 22 May 2, 2001, pp. 2001-2007.
Office Action mailed Jun. 22, 2007 cited in related U.S. Appl. No. 10/692,257.
Notice of Allowance mailed Mar. 27, 2007 cited in related U.S. Appl. No. 10/324,251.
Office Action mailed Aug. 3, 2007, cited in related U.S. Appl. No. 10/324,243.
Anderson, T., Change Your Outlook, Developer Netowork Journal, No. 25, p. 50-1, Jul.-Aug. 2001.
Taylor, T.C., Databases Save Time And Customers, Sales & Marketing Management, vol. 142, No. 4, p. 105-7, Mar. 1990.
Kubota, K.; Masuno, H., Multi-Media Software PI, NEC Technical Journal, vol. 41, No. 13, pp. 72-6, Nov. 1988.
Pettigrew, T., ACT!—Automated Contact Tracking, CA Magazine, vol. 95, No. 1022, p. 48-9, Sep. 1991.
Simaioforidis, A.; Karlgren, J.; Ereback, A., Research and Advanced Technology for Digital Libraries, Second European Conference, ECDL '98. Proceedings, p. 673-4, Sep. 21-23, 1998.
Heller, S.R., Symantec ACT! 4.0 for Windows, Journal of Chemical Information and Computer Sciences, vol. 38, No. 4, p. 772, Jul.-Aug. 1998.
Office Action mailed Jun. 5, 2007, cited in related U.S. Appl. No. 10/885,974.
Notice of Allowance mailed Jul. 3, 2007, cited in related U.S. Appl. No. 10/324,746.
Notice of Allowance mailed Aug. 8, 2007, cited in related U.S. Appl. No. 10/326,660.
Notice of Allowance mailed Aug. 9, 2007, cited in related U.S. Appl. No. 10/324,250.

* cited by examiner

INFORMATION PICKER

BACKGROUND OF THE INVENTION

1. The Field of the Invention

The present invention relates to user interface menus in computers and electronic devices and, more particularly, to methods, systems, and computer program products for controlling how contact information is provided to computer applications.

2. Background and Relevant Art

The term "contact," as described herein, generally refers to any person, group, organization, business, household, or other type of identifiable entity. The term "contact information," as defined herein, generally refers to any information that corresponds to a contact and that may be considered relevant for identifying, contacting, accessing, corresponding or communicating with the contact. In the context of the present application, contact information is used by an application to perform a desired function, such as, for example, sending an email, initiating a telephone call, accessing a website, initiating a gaming session, performing a financial transaction, and so forth. Non-limiting examples of contact information include names, aliases, telephone Me numbers, email addresses, home addresses, instant messaging (IM) addresses, and web addresses. Contact information can also refer to other types of information such as the status of a contact. For example, information indicating a contact is currently online, or on a telephone line may also be broadly considered as contact information.

Many applications require, access, transmit, or otherwise utilize contact information. Examples of some applications that utilize contact information include email applications, network gaming applications, instant messaging applications, telephone and telephony applications, Internet applications, financial applications, word processing applications, and business management applications.

Applications that utilize contact information typically provide interfaces or menus for entering desired contact information within one or more fields. For example, an email interface will typically include fields for receiving the email addresses of the intended email recipients. Contact information can also be gathered without the user's express knowledge. For example, with regard to the email application, contact information corresponding to the sender (i.e., the sender's name, email address, etc.) can be gathered behind the scenes, without requiring user input and sometimes even without the user's knowledge.

The contact information that is gathered by an application can then be published or otherwise used and sometimes without the user's express knowledge or consent. This can be very undesirable, particularly when the user has no intent for their contact information to be gathered at all.

Allowing applications to automatically gather contact information about a user can also be problematic, even when a user has provided implied or actual consent to the application to gather their information. For example, if a single computing system is shared by multiple people, the computing system may have access to different contact information for each of the people that share the computing system, thereby increasing the possibility that an application can obtain the wrong contact information for any particular person using the computing system at any particular time.

Yet another problem in the art is that existing applications typically do not expressly notify the user what the gathered contact information is going to be used for. This can make it difficult for a user to decide if they are willing to provide the requested contact information. Even if a user could eventually find such information by navigating to related web pages or to help menus that are associated with the application, this is undesirable, particularly if the user does not immediately know where to begin looking for such information. Accordingly, users typically have to make uninformed decisions about whether they want to provide their contact information or not.

Yet another problem in the art is that even if a user does consent to the gathering and use of their contact information, the computing system may not know which contact information to gather about a user. In particular, a user may have different sets of contact information or 'personas' that correspond to different environments in which they live. For example, a user may have a family persona, a school persona, a friends persona, a work persona, a recreational persona, and so forth, each corresponding to different aliases, addresses (e.g., physical/email), telephone numbers, and so forth. However, because an application may not know which information the user would prefer to have gathered, the wrong information may inadvertently be gathered and published or otherwise used by the application.

BRIEF SUMMARY OF THE INVENTION

The present invention is directed to improved methods, systems, and corresponding computer program products and interfaces for controlling how contact information is provided to one or more requesting applications and, more particular, for enabling a user to informatively control which of their contact information is gathered by an application.

According to one aspect of the invention, an interface object that identifies different contact personas corresponding to a user is displayed for user selection when an application requests contact information about the user. The user can then select the appropriate contact persona that they are willing to have corresponding and relevant information gathered about. For example, the list of personas that may be selected from can include a business persona, a personal persona, an e-commerce persona, an anonymous persona, or any other persona that has been developed and that the application can be provided access to. The contact information corresponding to the selected persona can then be provided to the requesting application, as selectively determined by the user.

Another interface can also be provided to enable a user to view corresponding information that is associated with the various personas. In some embodiments, this information picker interface defaults to requested persona information that is intended to be sent to the calling application. The user can then choose to send the information or different information, rather than the default information, by using the information picker.

The information picker interface can be accessed by special request or whenever an application seeks information about a user. The contact information that is displayed by the information picker can exhaustively display all of the contact information that is associated with a given persona, or, alternatively, only the contact information that is being requested at a particular moment by an application, or any combination thereof. The information picker can also be configured to display and provide access to the privacy policies of the applications that seek information about the user and that explain how the user's contact information will be used, thereby enabling the user to make informed decisions about what contact information the applications will be granted access to.

The present invention can be practiced to overcome some of the known problems in the art. In particular, the interfaces that are provided by the present application and their use can enable a user to be apprised of an applications request for contact information and can provide a user some control over what information is gathered and how it is used by requesting applications.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer-program products for controlling how contact information is organized and presented to applications for use.

The term "application," as used herein, can include interfaces, modules, code and computer-executable instructions, that can be run by a user in order to complete some action, including, but not limited to web-based applications. This of course, includes applications hosted locally by the user's computing system, as well as applications hosted by remote systems.

The term "contact information," as used herein, and which is defined above in more detail, generally includes information that corresponds to a contact and that may be considered relevant for identifying, contacting, accessing, corresponding or communicating with the contact. Contact information can also be defined as any information corresponding to a person.

The term "persona," which is used at times herein interchangeably with the term "profile," is generally defined as a particular way a person can be described or identified by contact information. Accordingly, each person may have, although not necessarily, multiple personas that are each associated with different contact information about a person. Examples of personas can include, but are not limited to, a family persona, a school persona, a friends persona, a work persona, a recreational persona, a business persona, an e-commerce persona, an anonymous persona, and a personal persona. The various personas and their corresponding contact information can be stored in tables, indexes and other data structures that are made available to the user's computing system.

In various embodiments described herein, interfaces are used to control association of and access to contact information. These interfaces can be created, modified and used through computer software components, which are sometimes referred to herein as computer-executable instructions or computing modules.

As described herein, a programming interface (or more simply, an interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Accordingly, it will be appreciated that the embodiments of the invention can include special purpose and general-purpose computing devices including various computer software and hardware that can be used to enable the interfaces described herein. The embodiments within the scope of the present invention can also include computer-readable media for carrying or having the computer-executable instructions or data structures stored thereon that comprise the interfaces and the code for using and modifying them.

It will be appreciated that the computer-readable media can be any available media that can be accessed by a general purpose or special purpose computer, including, but not limited to mobile communications devices. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-executable instructions comprise, for example, instructions and data which cause a general purpose computer, special purpose computer, or special purpose processing device to perform a certain function or group of functions, such as the acts and steps described below.

When information is transferred or provided over a network or another communications connection (either hardwired, wireless, or a combination of hardwired or wireless) to a computer or mobile communications device, the computer/device properly views the connection as a computer-readable medium. Thus, any such connection is properly termed a computer-readable medium. Combinations of the above should also be included within the scope of computer-readable media.

Controlling Access to Contact Information

Figure 1:
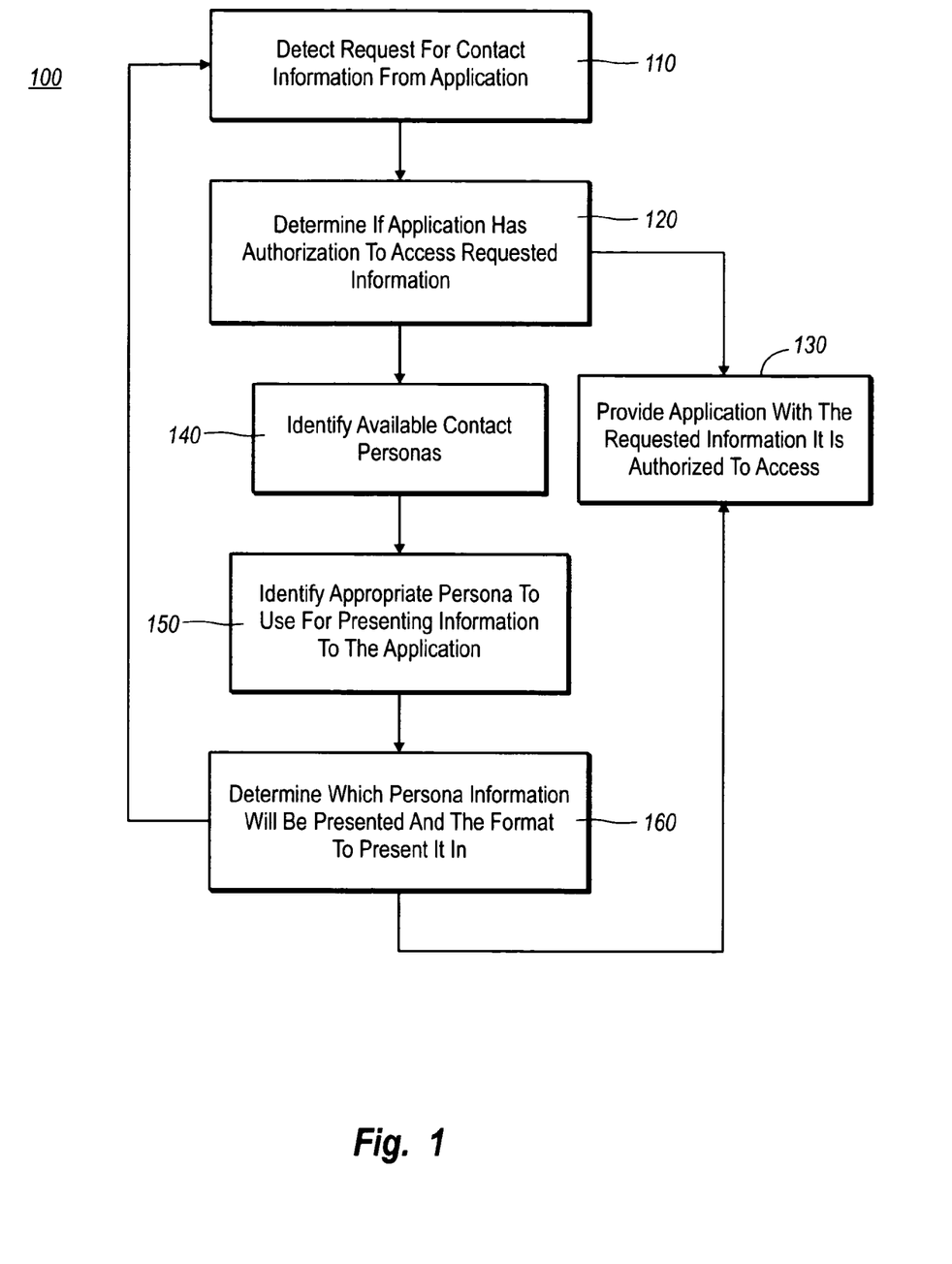
FIG. 1 is a flowchart illustrating a method and corresponding acts for controlling how contact information is provided to applications, according to one embodiment of the invention.

FIG. 1 illustrates a flowchart of a method having various acts for controlling how contact information is provided to requesting applications according to one embodiment of the invention. The first illustrated act includes detecting a request for contact information from an application (act 110). This can be accomplished, for example, by monitoring requests that are made to a general contact information repository or to any number of specific application contact information registries.

Various applications can request different types of contact information. For example, the hosting application can request telephone numbers, email addresses, physical address, names, personal identification numbers, credit card numbers, and so forth.

According to one embodiment, however, the applications only request the contact information is required by the applications to perform an intended function, despite the availability of other contact information. For example, an email application may only require a name or alias and an email address. In other embodiments, however, applications may also request additional information that is not necessarily required, but that the application is configured to gather nonetheless. For example, an Internet application may not need a user's telephone number, but may request it anyway, so that it can later be sold to a telemarketing company. In such circumstances, a user might find it desirable to prevent the application from gathering unnecessary information. In such cases, the methods and interfaces of the invention can be utilized to prevent the application from obtaining contact information that is not required by the application.

In particular, the methods of the invention can include the act for determining whether an application has authorization to access the requested information (act 120). This can be based in part on whether the information is needed by the application and how it will be used. In one embodiment, for example, shown and described below in more detail with reference to FIG. 3, a user can be informed about the application's intended use for the contact information, as well as the types of contact information that are being requested by the user. Upon being informed, the user can then control whether the application is granted authorization to access the requested information or may instead choose to pick the information that is presented to the application.

According to another embodiment, authorization is automatically performed through the use of access control lists (ACL's) that exist on the user's computing system. The ACL entry specifically granting access permission to the information requested by the application.

Authorization can also be determined inherently through the interfaces that are described herein, such as, for example, by determining whether the contact information requested by the application corresponds with the information that is already associated with one or more personas that the user has selected to be made available to the application, either at the time the information is requested or at an earlier time.

If it is determined that the application has authorization to access the information, then the requested information is provided (act 130). However, if authorization has not already been granted to the application, and even in some cases where it has, the user can still select the desired contact information or use a persona to provide the application with appropriate information.

A persona generally comprises contact information that can be used to describe a particular profile of a person. For example, a business persona may include a person's work address, work telephone number, work email address, a work alias or title, and so forth. Whereas, a personal persona may include a personal cell phone number, private email address, home address, and so forth.

As mentioned above, a user can have any number of personas. The personas can also be created or modified by the user, as described below, or implicitly defined by the user's interaction with various applications. For example, if an application has previously asked for and obtained a user's home telephone number and address, the modules of the invention can enable such information to be tracked and automatically used to develop a corresponding profile or persona for the user.

To help the user select an appropriate persona, the user's computing system or other computing system that has access to the user's contact information and corresponding personas proceeds to identify the available contact personas (act 150).

In some cases, the user may not have any personas that are currently developed or that can be identified. In these circumstances, the identification- of available contact personas can include the generation of default personas, even though the contact information provided within the default personas is wrong or missing. Thereafter, the user can modify the contact information that is associated with the various personas through an interface, as described below in more detail with reference to FIG. 3.

Identification of the available personas (act 150) can also include the process of determining who the logged on user is. If no one is presently logged onto the computing system, such that it is being used anonymously, the actual user may be prompted to log on or to otherwise identify themselves so that the user's personas can be identified. In other embodiments, the identity of the user is obtained from the application that is requesting the contact information and that has in some way indicated who the user is. In yet other embodiments, any number of the available personas that can be accessed by a computing system are identified, even though they may not all correspond to the person for whom contact information is being requested.

Once the contact personas have been identified, they are presented to a user for selection, thereby enabling the user to select or otherwise identify the appropriate persona for which corresponding contact information will be provided to the requesting application (act 150).

In one embodiment, the available personas are presented through an interface object that is integrated within the interface of the requesting application. For example, in FIG. 2A, an email application interface 200 is shown to have an integrated profile menu object 210 that can be selected to display one or more of the identified personas. Integrating the interface object can be performed, for example, by actually modifying the application's Graphical User Interface (GUI) or by simply overlaying the GUI with the interface object.

Although the interface object can be integrated within the interfaces of existing applications, it will be appreciated that in other embodiments, the interface object can also comprise a separate stand alone interface, menu, icon or other object that is presented to the user independently of the application's interface.

Figure 2A:
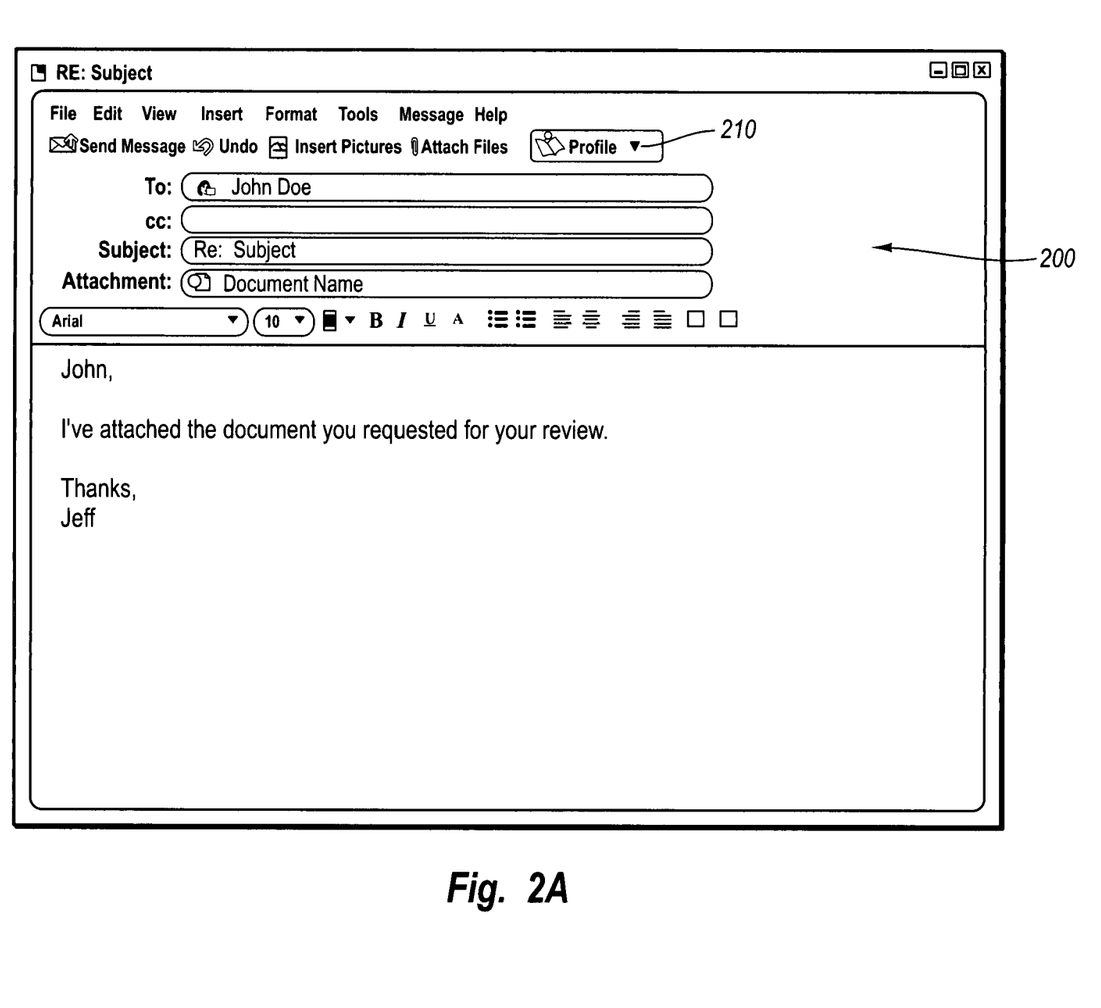
FIG. 2A illustrates one embodiment of an email application interface that is displayed with an interface object that can be utilized to identify various personas for which a user's contact information may be gathered.
Figure 2B:
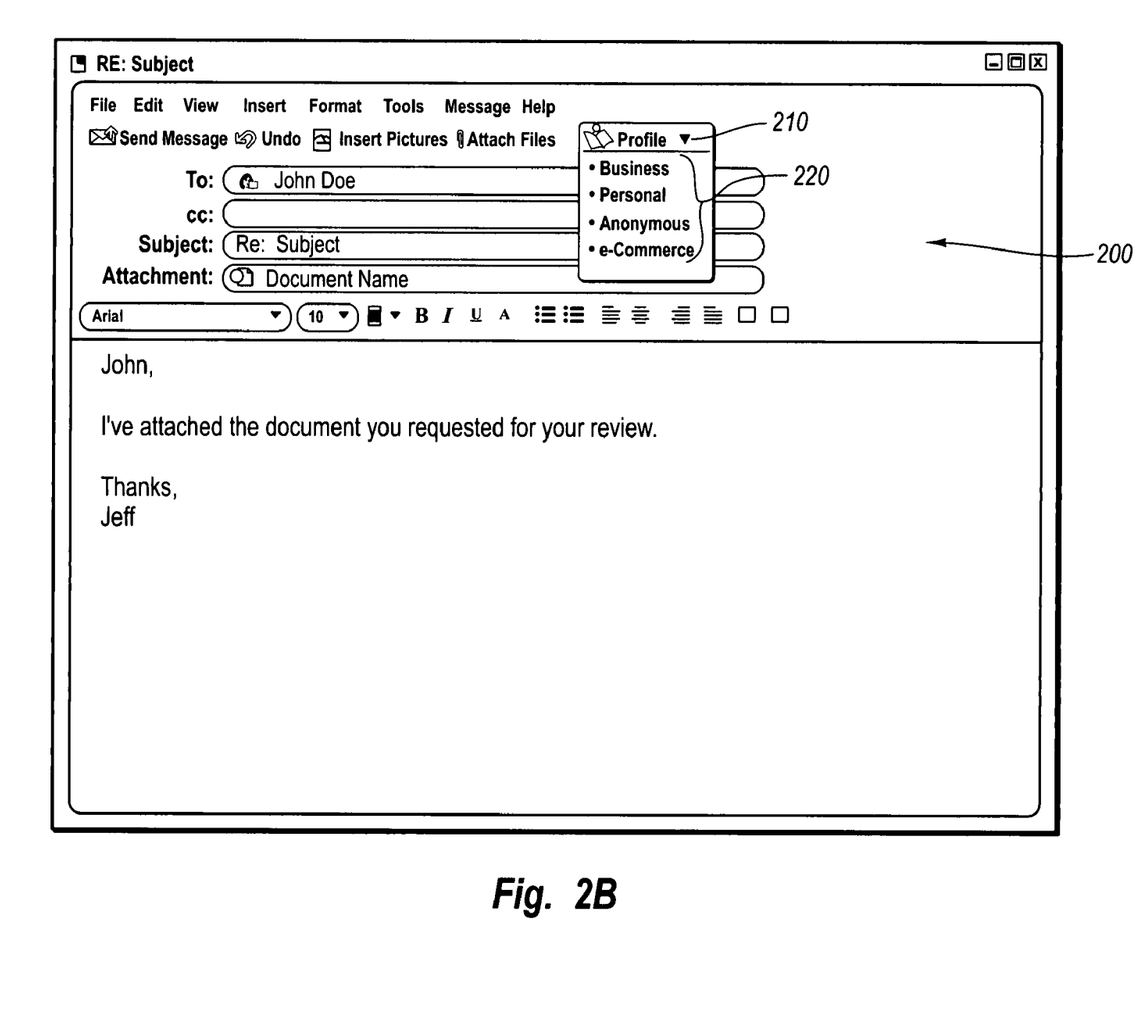
FIG. 2B illustrates one embodiment of the email application interface from FIG. 2A in which the interface object has been selected and displays various personas that can be selected to control which contact information about a user may be gathered by the email application.

FIG. 2B illustrates one embodiment in which the profile menu object 210 has been selected and expanded to reflect a list 220 of four distinct personas, a business persona, a personal persona, an anonymous persona and an e-commerce persona. As described above, each of these personas can be associated with corresponding contact information that the user decides is relevant and appropriate for different applications.

In other embodiments, the user can also be presented with additional personas that have been identified and that might correspond with different people, such as for example, when the user has not yet been identified by the computing system through a logging on procedure.

To protect contact information that may be confidential, such as, for example, personal identification numbers, social security numbers, bank account numbers, etc., security modules can also be provided to prevent a user from accessing or utilizing the personas of different users unless they have been authorized to do so. Such authorization may require the user to log in or to provide other certain information to verify their identity.

In the present example, an email application has requested contact information about the user that will be included in metadata and headers for outgoing mail. The user may not have been made aware of this, but upon seeing the profile interface object 210, the user can be informed that the application is seeking certain information. To provide even more notice to the user, the interface object can be displayed in an even more notorious or evident manner.

Figure 3:
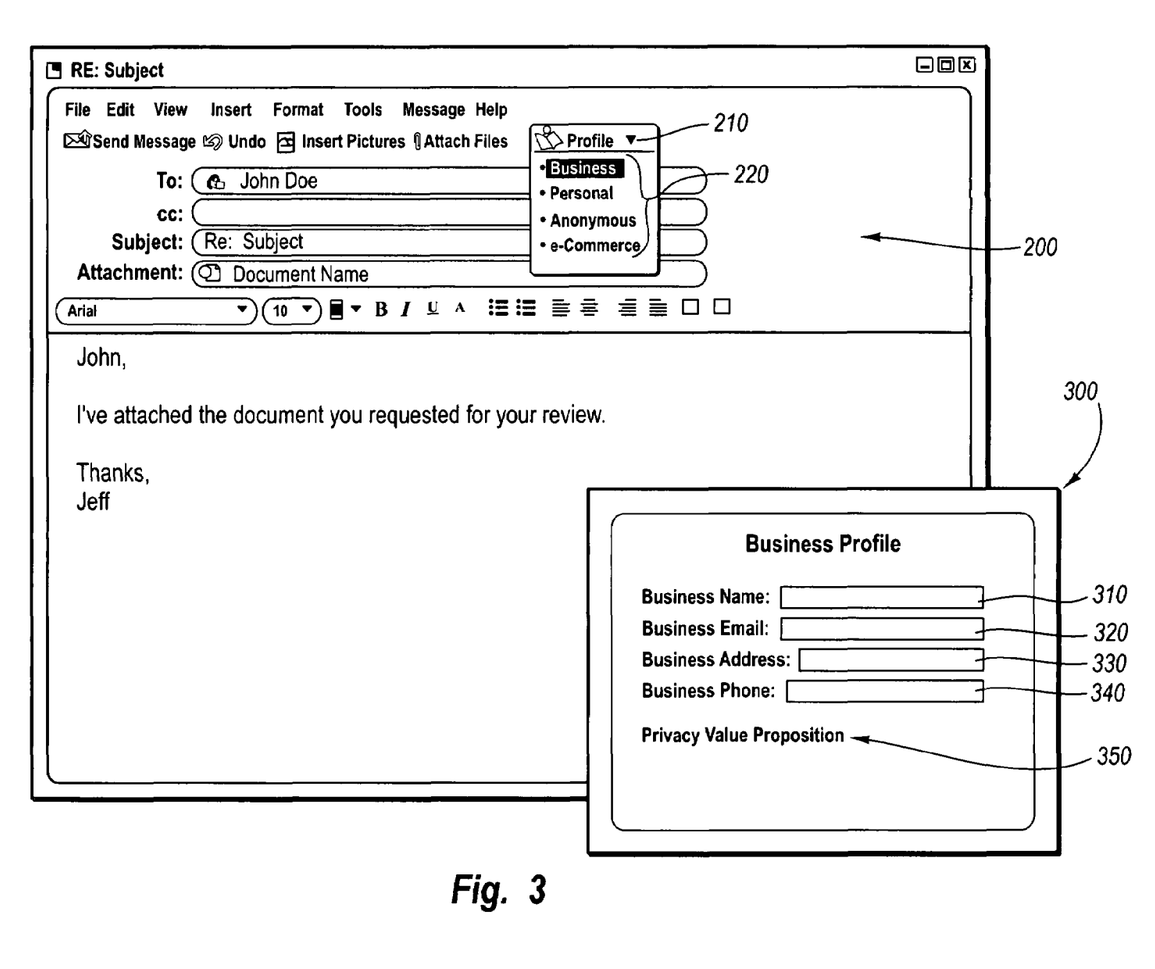
FIG. 3 illustrates one embodiment of the email application interface from FIGS. 2A and 2B along with an information picker interface that is displaying various contact information corresponding to a user's business persona.

The user can be further informed about the information the application is seeking through a separate interface, such as, for example, the interface 300 shown in FIG. 3, which can be launched from the interface object 210 or that can be automatically launched when the applications requests information.

It can be useful to notify the user of an application's request for information because some requests are not explicitly made to the user, but instead are made to the user's computing system without the user's express knowledge. Likewise, some requests for information are made at times that predate the user's ultimate use of an application, such that a reminder to the user of the application's request for information can be useful.

Turning now to FIG. 3, one embodiment of an interface 300 is provided that can be used to pick or otherwise select information that is associated with a profile. This interface 300 can be launched automatically in response to a request for information, or, alternatively, in response to a specific request by the user. For example, the user can specifically request the interface at any time to develop and modify their corresponding personas. A user can also request the interface 300 indirectly by selecting a persona from the interface object 210, as described above. For example, in the present embodiment, the user has selected the business persona from the list of available personas 220. This selection has caused the business profile or persona to be displayed in the information picker interface 300.

The business profile currently includes fields for a business name (310), email address (320), physical address (330), and phone number (340), each of which can be populated with the appropriate information. This information can be added at any time, prior to the application requesting the information, or after. This information can also be modified by a user at the interface 300.

The types of information that are presented in the interface 300 can be limited to the specific information being requested by the application or, more broadly, can include all types of related contact information that is associated with the user's corresponding persona.

The interface can also include additional information, such as the privacy value proposition 350 of the application and/or of the application's owners that will inform the user what the contact information will be used for. This privacy and use information can be directly included in the interface 300, or, alternatively, it can be linked to from one or more objects, such as a hyperlink, that are provided by the interface 300. The privacy and use information can be specifically requested by the modules of the present invention as a prerequisite to providing the requested contact information to the applications. Alternatively, this information can be voluntarily provided without request.

The next illustrated act is to determine which of the available persona information will be presented and the format in which it will be presented (act 160). In particular, a persona may include more information than a user wishes to make available to an application. Likewise, an application may not want all of the contact information that is made available by a persona. Accordingly, the request by the application can be automatically matched with the available information to identify the information that will be presented. Alternatively, a user can be required to manually enter the information into the fields of the interface 300, and to explicitly approve the transmission of the information, if any, that is displayed by the interface 300.

If at anytime the user wants to change the contact information that is being provided to the application, they can modify it through the interface 300 as mentioned above.

The format in which the information is presented can also be specifically requested by an application. For example, an application might request the information be provided in a V-card format, in list, or in another format.

The appropriate contact information that has been requested is then presented in the appropriate format (act 130). What is considered appropriate is generally application specific and corresponds to the application's request for information as well as the persona that was selected by the user. By way of example, the appropriate contact information for an email application could include the business email address and business name of a user, if the user has specifically selected that the business persona be used to satisfy the application's request for information.

It will be appreciated that by doing this, the user can control what information is published and used by the application. For example, the outgoing messages will include only the user's business name and email address to identify the sender. Likewise, if the user were to select the anonymous persona for a new email, the new outgoing email would then include an anonymous email address and name that would not identify the sender or that would only identify the sender in some anonymous way.

Although the previous example is provided with respect to email functionality, it will be appreciated that the scope of the invention extends to other embodiments in which contact information is utilized by other application to enable different functionality. For example, other applications may utilize the methods and interfaces of the invention include applications that use contact information to initiate a telephony session, initiate a telephone call, initiate a network connection, initiate a gaming session, access a website, perform a financial transaction, send material goods via postal mail, and so forth. These applications can be hosted by the user's computing system or by a remote computing system.

It will be appreciated that the present invention, as it has been described, overcomes many of the problems with controlling how contact information is provided to applications. In particular, the interfaces that are provided by the present application and their use can enable a user to be informed of application requests for contact information and can provide a user control over what information is gathered and how it is used by requesting applications.

Computing Environment

It will be appreciated by those skilled in the art that the invention may be practiced in computing systems and network computing environments with various configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
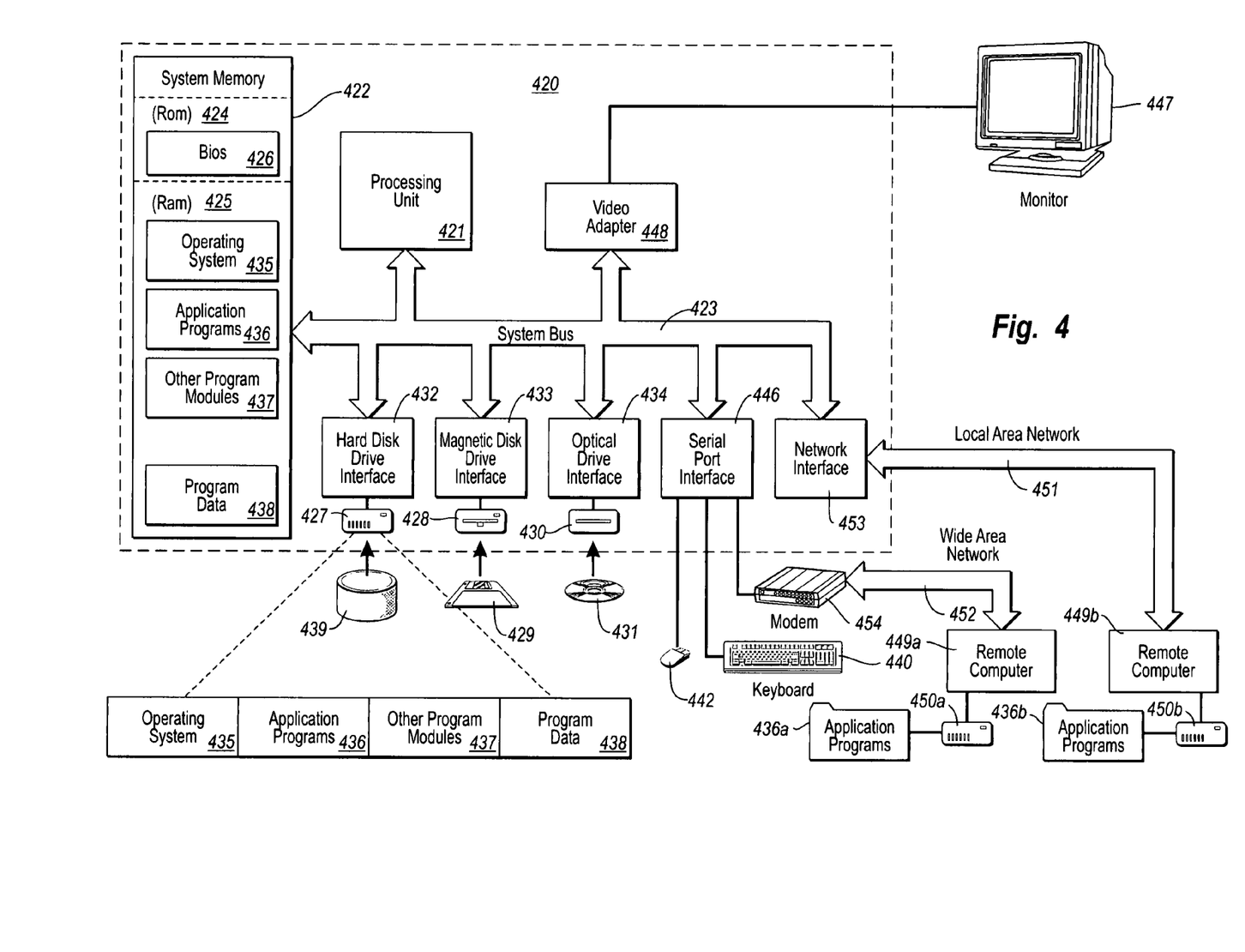
FIG. 4 illustrates one embodiment of a computing system that can be utilized to practice aspects of the invention.

With reference to FIG. 4, an exemplary system that can be used, for example to develop aggregate user preference data and to perform many of the other acts and steps of the invention is provided. The illustrated system includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention can also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer that stores contact information and that runs one or more applications, a method for controlling how the contact information is provided to the one or more applications, the method comprising:
   detecting a request from an application that is running on the computer for contact information corresponding to a particular user that is logged on to the computer;
   upon detecting the request and prior to providing the application with contact information,
      determining whether the application is authorized to access the contact information, and
         upon determining that the application is authorized to access the contact information, identifying available contact personas associated with the particular user, each of the contact personas comprising contact information about the user;

after detecting the request and prior to providing the application with the requested contact information, informing the user that the application is seeking certain contact information by presenting to the user a list of a plurality of selectable contact personas that are each associated with the user and that each contain different contact information about the user, and presenting to the user a privacy value proposition to inform the user how the application will use the contact information;

receiving a user selection of a contact persona from the list of the plurality of contact personas, wherein the user selection of the contact persona grants access to the application to access the selected contact persona;

determining an appropriate format in which the contact information corresponding to the selected contact persona is to be presented to the application; and providing the application with the contact information corresponding to the selected contact persona.

2. A method as recited in claim 1, further comprising:

after having detected the request for contact information from an application and after having informed the user that the application is seeking certain contact information, requiring the user to explicitly approve transmission of contact information.

3. A method as recited in claim 1, wherein the corresponding contact information to be provided to the application constitutes a subset of the available contact information associated with the selected contact persona.

4. A method as recited in claim 3, wherein the subset of the available contact information to be provided to the application is selected based on the intended use of the contact information.

5. A method as recited in claim 1, wherein whether the application is authorized to access the contact information is determined based upon one or more authorizations provided in an access control list of the computing system.

6. A method as recited in claim 1, wherein the requested contact information includes at least one of a name and an address.

7. A method as recited in claim 1, wherein the contact information corresponding to a first contact persona differs from the contact information corresponding to a second contact persona even though the first and second contact personas both correspond to the user.

8. The method recited in claim 1, wherein the method further includes displaying a graphical user interface object within an application interface associated with the application requesting the contact information, the graphical user interface object comprising a selectable object which, when selected by the user, displays the list comprising the plurality of selectable contact personas that are each associated with the user and that each contain different contact information about the user.

9. In a computer that stores contact information and that runs one or more applications, a method for controlling how the contact information is provided to the one or more applications, the method comprising:

in response to a request for contact information by an application that is running on the computer and prior to providing contact information to the application, informing the user that is logged on to the computer that the application is seeking certain contact information by providing an interface object which, when selected, displays a list of a plurality of individually listed and selectable contact personas that are each associated with the user, and in response to the user selecting the interface object, displaying the plurality of contact personas and one or more privacy policies of the application that specify at least one of how and when the contact information will be used by the application, and allowing the user to select one of the contact personas for which corresponding contact information is to be provided to the application, wherein the corresponding contact information for a first contact persona in the displayed list of contact personas differs from the contact information for a second contact persona in the list of contact personas, even though the first and second contact personas are both associated with the user;

in response to receiving a user selection of a particular contact persona from the list of contact personas, displaying the contact information corresponding to the selected contact persona;

enabling the user to modify the contact information corresponding to the selected contact persona; and upon the user approving the respective contact information, providing the contact information corresponding to the selected contact persona to the application.

10. A method as recited in claim 9, wherein the plurality of listed and selectable contact personas includes at least a business persona, a personal persona, and an anonymous persona.

11. A method as recited in claim 9, wherein the requested contact information includes at least one of a name and an address.

12. A method as recited in claim 9, wherein the plurality of listed and selectable contact personas also includes an e-commerce persona.

13. A computer program product for use in a computer that stores contact information and that runs one or more applications, the computer program product comprising one or more computer-readable storage media having stored computer-executable instructions for implementing the method recited in claim 1.

14. A computer program product as recited in claim 13, further comprising:

after having received the request for contact information from an application and after having informed the user that the application is seeking certain contact information, requiring the user to explicitly approve the transmission of contact information.

15. A computer program product as recited in claim 13, wherein the corresponding contact information to be provided to the application constitutes a subset of the available contact information associated with the selected contact persona.

16. A computer program product as recited in claim 15, wherein the subset of the available contact information to be provided to the application is selected based on the intended use of the contact information.

17. A computer program product as recited in claim 13, wherein whether the application is authorized to access the contact information is determined based upon one or more authorizations provided in an access control list of the computing system.

18. A computer program product as recited in claim 13, wherein the requested contact information includes at least one of a name and an address 19. A computer program product as recited in claim 13, wherein the contact information corresponding to a first contact persona differs from the contact information corresponding to a second contact persona, even though the first and second contact personas both correspond to the same entity.

20. A computer program product for use in a computer that stores contact information and that runs one or more applications, the computer program product comprising one or more computer-readable storage media having stored computer-executable instructions for implementing the method recited in claim 9.

21. A computer program product as recited in claim 20, wherein the plurality of listed and selectable contact personas includes at least a business persona, a personal persona, and an anonymous persona.

22. A computer program product as recited in claim 20, wherein the plurality of listed and selectable contact personas also includes an e-commerce persona.

* * * * *